United States Patent
Tsukamoto

(10) Patent No.: US 11,498,642 B2
(45) Date of Patent: Nov. 15, 2022

(54) RETROFIT ELECTRIC MACHINE FOR BICYCLE AND BICYCLE

(71) Applicant: HONDA MOTOR CO., LTD., Tokyo (JP)

(72) Inventor: Kenji Tsukamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 61 days.

(21) Appl. No.: 17/054,857

(22) PCT Filed: Mar. 27, 2019

(86) PCT No.: PCT/JP2019/013247
§ 371 (c)(1),
(2) Date: Nov. 12, 2020

(87) PCT Pub. No.: WO2019/220785
PCT Pub. Date: Nov. 21, 2019

(65) Prior Publication Data
US 2021/0214042 A1  Jul. 15, 2021

(30) Foreign Application Priority Data
May 16, 2018 (JP) .............................. JP2018-094503

(51) Int. Cl.
*B62M 6/55* (2010.01)

(52) U.S. Cl.
CPC ...................................... *B62M 6/55* (2013.01)

(58) Field of Classification Search
CPC . B62M 6/55; B62M 6/50; B62M 1/36; B62M 3/003; B62M 23/02
(Continued)

(56) References Cited

U.S. PATENT DOCUMENTS 9,718,514 B2 *  8/2017  Kawakami ............... B62M 6/50
9,915,302 B2 *  3/2018  Usami .................. B62K 25/286
(Continued)

FOREIGN PATENT DOCUMENTS

JP       2002264881 A       9/2002
JP       2007091159 A       4/2007
(Continued)

OTHER PUBLICATIONS

Extended European Search Report for Application EP 19803683.2 dated May 17, 2021; 8 pp.
(Continued)

*Primary Examiner* — Anne Marie M Boehler
(74) *Attorney, Agent, or Firm* — Armstrong Teasdale LLP

(57) ABSTRACT

To allow a wide range of existing bicycles to be easily converted into electric power assisted bicycles, a retrofit electric machine for a bicycle includes: a housing (52) configured to be attached to a frame (18) of a bicycle (10), an electric motor (54) attached to the housing (52); an annular rotating plate (84) mounted on the housing (52) in a rotatable manner to be centered around a rotational center line of a crankshaft (24) for a pedal of the bicycle (10), and connected to the electric motor (54) in a torque transmitting relationship; and a connecting member (90) including a first connecting portion (92) connected to the crankshaft (24) with a shape fit so as to rotate integrally with the crankshaft (24), and a connecting pin (98) secured to the rotating plate (84).

10 Claims, 9 Drawing Sheets

(58) Field of Classification Search
USPC .................................................. 180/206.4
See application file for complete search history.

(56) References Cited

U.S. PATENT DOCUMENTS

| | | | |
|---|---|---|---|
| 10,494,054 B2* | 12/2019 | Venzal | .................... B62M 6/50 |
| 11,052,961 B2* | 7/2021 | Hendey | ................. B62K 19/18 |
| 2010/0263468 A1 | 10/2010 | Fisher et al. | |
| 2012/0312618 A1* | 12/2012 | Chan | ....................... B62M 6/55 |
| | | | 180/206.4 |
| 2013/0032425 A1 | 2/2013 | Lee et al. | |
| 2014/0196970 A1* | 7/2014 | Biechele | ............... B62K 19/40 |
| | | | 180/206.4 |
| 2014/0345421 A1 | 11/2014 | Gingl et al. | |
| 2017/0267314 A1 | 9/2017 | Liang et al. | |
| 2017/0320538 A1 | 11/2017 | Sprote et al. | |
| 2021/0052941 A1* | 2/2021 | Tsukamoto | ............. B62M 6/50 |

FOREIGN PATENT DOCUMENTS

| | | | |
|---|---|---|---|
| JP | 2009248668 A | 10/2009 | |
| KR | 20180077611 A | 7/2018 | |

OTHER PUBLICATIONS

Bimoz User Manual INDIEGOGO edition. Version 1.0, Z Institute AG, 2016, pp. 5-13.
International Search Report for PCT Application PCT/JP2019/013247 dated Jul. 2, 2019; 4 pp.

* cited by examiner

RETROFIT ELECTRIC MACHINE FOR BICYCLE AND BICYCLE

CROSS-REFERENCE TO RELATED APPLICATIONS

This application is a U.S. National Phase Application of PCT/JP2019/013247, filed on Mar. 27, 2019. PCT/JP2019/013247 claims the benefit of Japanese Patent Application No. 2018-094503, filed on May 16, 2018. These applications are hereby expressly incorporated by reference in their entirety.

TECHNICAL FIELD

The present invention relates to a retrofit electric machine for a bicycle and a bicycle, and more particularly to a retrofit electric machine for an electric power assisted bicycle, and a bicycle fitted with the retrofit electric machine.

BACKGROUND ART

Known electric power assist devices for bicycles that can be retrofitted to existing bicycles include the one in which an assist gear rotatively driven by an electric motor for providing an assist force is attached coaxially to a side of a sprocket mounted to a center shaft of a pedal crankarm, and the assist gear and the sprocket are connected to each other via a torque transmitting member so that the assist force is applied to the sprocket (see Patent Document 1, for instance), the one in which a main gear rotatively driven by an electric motor for providing an assist force is coaxially disposed relative to the center shaft of a pedal crankarm, and the main gear and the sprocket are connected to each other via a torque transmitting member so that the assist force is applied to the sprocket (see Patent Document 2, for instance), and the one in which a sprocket rotatively driven by an electric motor for providing an assist force is connected coaxially to a pedal crankarm (see Patent Document 3, for instance).

PRIOR ART DOCUMENT(S)

Patent Document(s)

Patent Document 1: JP2007-091159A
Patent Document 2: JP2009-248668A
Patent Document 3: JP2002-264881A

SUMMARY OF THE INVENTION

Task to be Accomplished by the Invention

The conventional electric power assist devices for a bicycle that can be retrofitted require a significant amount of disassembling work for removing the crankarm, the sprocket, and the like, and assembling work for restoring such parts to the original state, at the time of fitting the electric power assist device to the bicycle. Special tools may be required for the disassembling and assembling work, in addition to the regular tools such as wrenches and spanners. Therefore, a typical user in particular a user not accustomed to mechanic's work may experience some difficulty in converting an existing bicycle into an electric power assisted bicycle by using a retrofit electric power assist device for a vehicle. Furthermore, the electric power assist devices may be lacking in versatility so that the devices may not be retrofitted to the existing bicycle depending on the model thereof.

An object of the present invention is to provide a device that allows a typical user to easily convert a wide range of existing bicycles into electric power assisted bicycles or the like.

A retrofit electric machine for a bicycle according to one embodiment of the present invention comprises: a housing (52) configured to be attached to a frame (18) of a bicycle (10), a rotating electric machine (54) attached to the housing (52); an annular rotating member (84) mounted on the housing (52) in a rotatable manner to be centered around a rotational center line of a crankshaft (24) for a pedal of the bicycle (10), and connected to the rotating electric machine (54) in a torque transmitting relationship; and a connecting member (90) including a first connecting portion (92) configured to be connected to the crankshaft (24) with a shape fit so as to rotate integrally with the crankshaft (24), and a second connecting portion (96, 98, 100, 106) secured to the rotating member (84).

Thereby, the retrofit electric machine (50) for a bicycle can be easily retrofitted to a wide range of existing bicycles (10) without modifying the bicycles (10).

In the retrofit electric machine for a bicycle defined above, preferably, the first connecting portion (92) includes external teeth (40D) formed in a fixing member (40) configured to be fixed to the crankshaft (24), and internal teeth (94A) formed in the first connecting portion (92) and meshing with the external teeth (40D).

Thereby, a highly stable and reliable shape fit can be achieved.

In the retrofit electric machine for a bicycle defined above, preferably, the second connecting portion (96, 98, 100, 106) includes an abutting portion configured to abut against a surface (26A) of a crankarm (26) connected to the crankshaft (24) on a trailing side of a pedaling rotational direction thereof.

Thereby, the rotation of the rotating electric machine (54) can be transmitted to the crankshaft (24) via the crankarm (26) in a reliable manner.

In the retrofit electric machine for a bicycle defined above, preferably, the connecting member (90) is provided with a linear shape, a U-shape or a V-shape as viewed in an axial direction of the crankshaft (24), and has the first connecting portion (92) in an intermediate part thereof and the second connecting portion (96, 98) in each end part thereof, at least one of the second connecting portions being provided with the abutting portion.

Thereby, the concentricity of the rotating member (84) relative to the crankshaft (24) can be improved, and the connecting strength between the rotating member (84) and the crankshaft (24) can be improved.

Preferably, this retrofit electric machine for a bicycle further comprises a rubber member (110) attached to the rotating member (84) so as to elastically abut against a surface (26B) of the crankarm (26) on a leading side of the pedaling rotational direction thereof.

Thereby, the connection between the crankarm (26) and the rotating member (84) can be maintained without rattling in a reliable manner during use.

In the retrofit electric machine for a bicycle defined above, preferably, the connecting member (90) is X-shaped as viewed in an axial direction of the crankshaft (24), and has the first connecting portion (92) in a central part thereof and the second connecting portion (96, 98, 100, 106) in each end part thereof, at least one of the second connecting portions being provided with the abutting portion.

Thereby, the concentricity of the rotating member (84) relative to the crankshaft (24) can be improved, and the connecting strength between the rotating member (84) and the crankshaft (24) can be improved.

In the retrofit electric machine for a bicycle defined above, preferably, the second connecting portion includes an abutting pin (119) fixed to the rotating member (84) and provided with an abutting portion configured to abut against a surface (26A) of a crankarm (26) connected to the crankshaft (24) on a trailing side of a pedaling rotational direction thereof, a link member (112) having an end connected to the abutting pin (119), and a clamp arm (118) pivotally connected to another end of the link member (112) and provided with an eccentric cam portion (116) configured to abut against a surface (26B) of the crankarm (26) on a leading side thereof with respect to the pedaling rotational direction.

Thus, the crankarm (26) is clamped between the connecting pin (98) and the eccentric cam portion (116) in the rotational direction so that the rotating member (84) and the crankarm (26) are firmly connected to each other without rattling both in the forward direction (pedaling rotational direction) and the reverse direction.

In the retrofit electric machine for a bicycle defined above, preferably, the housing (52) includes an annular part (52C) concentrically supporting the rotating member (84), and the annular part (52C) and the rotating member (84) are configured to be positioned between the frame (18) and the crankarm (26).

Thereby, the annular part (52C) and the rotating member (84) can be positioned between the frame (18) and the crankarm (26) by passing the crankarm (26) therethrough without requiring to remove the crankarm (26) so that the retrofitting the retrofit electric machine (50) for a bicycle to a bicycle (10) is facilitated.

This retrofit electric machine for a bicycle preferably further comprises a transmission gear train (60, 66, 68, 80) provided inside the housing (52) between the rotating electric machine (54) and the rotating member (84) such that the rotating electric machine (54) is offset radially outward relative to the rotating member (84) owing to positioning of the transmission gear train (60, 66, 68, 80).

Thereby, the rotating electric machine (54) does not obstruct the positioning of the rotating member (84) relative to the crankarm (26).

In the retrofit electric machine for a bicycle defined above, preferably, the rotating electric machine (54) consists of an electric motor for generating an assist force, and the retrofit electric machine further comprises a battery (132) configured to be mounted on the frame (18) and to serve as a power source for the electric motor.

Thus, an electric power assisted bicycle can be obtained.

Another embodiment of the present invention provides a bicycle fitted with the retrofit electric machine for a bicycle according to the embodiment described above.

By retrofitting the retrofit electric machine (50) for a bicycle to an existing bicycle, the bicycle can be converted into an electric power assisted bicycle or the like without modifying the bicycle (10).

EFFECT OF THE INVENTION

The retrofit electric machine for a bicycle according to the present invention thus allows a wide range of existing bicycles to be easily converted into electric power assisted bicycles or the like.

BRIEF DESCRIPTION OF THE DRAWING(S)

DESCRIPTION OF THE PREFERRED EMBODIMENT(S)

A retrofit electric device for a bicycle according to a first embodiment of the present invention as applied to an electric power assist device for a bicycle is described in the following with reference to FIGS. 1 to 3.

Figure 1:
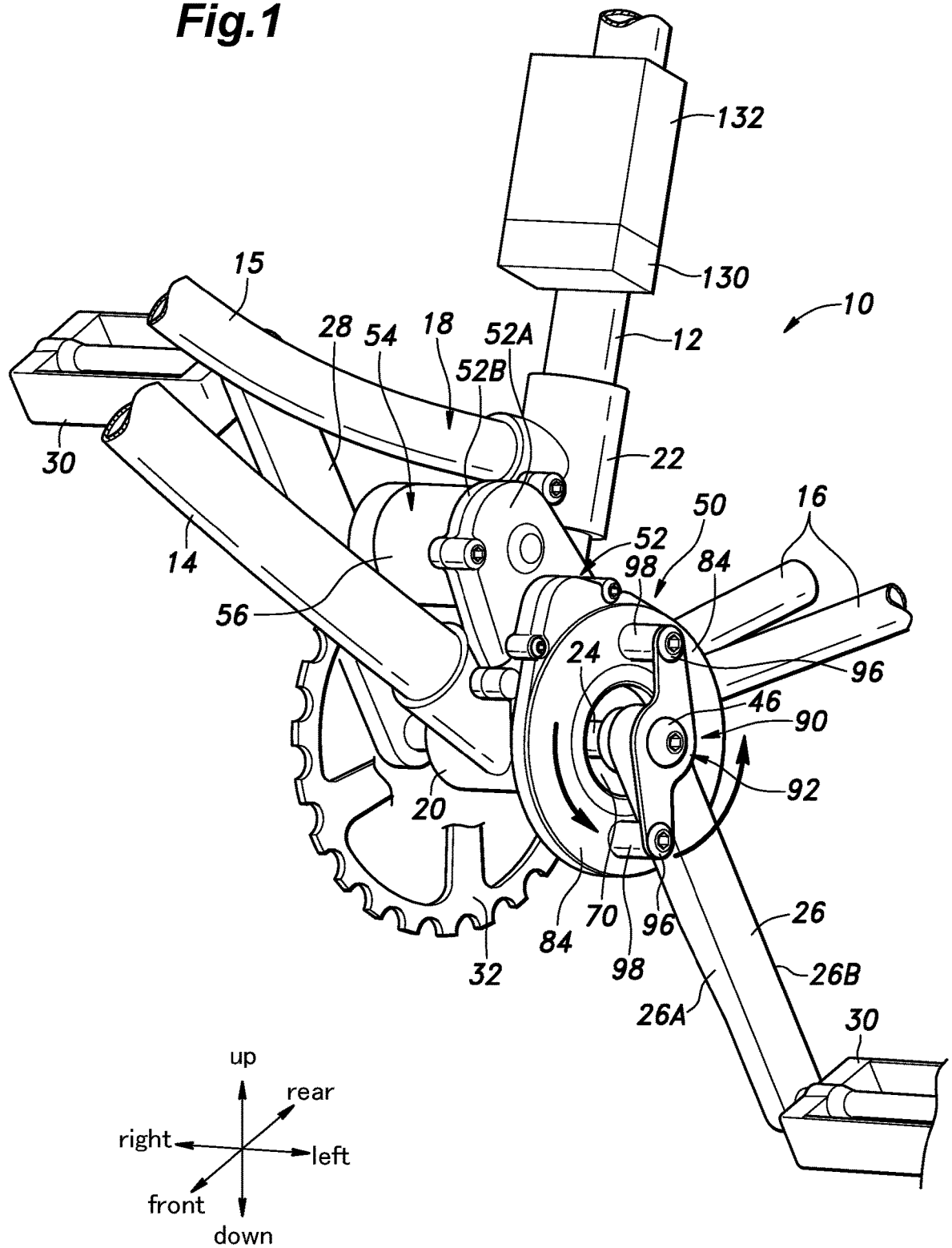
FIG. 1 is a perspective view of a principal part of a bicycle to which a retrofit electric machine for a bicycle (an electric power assist device for a bicycle) according to a first embodiment of the present invention is mounted.

As shown in FIG. 1, a bicycle 10 is provided with a structural frame 18 that includes a seat tube 12 extending in a substantially vertical direction, a down tube 14 extending in a substantially fore and aft direction, an auxiliary tube 15 and a pair of chain stays 16 provided on either side thereof The lower end of the seat tube 12, the rear end of the down tube 14, and the front ends of the chain stays 16 are joined to one another by a tubular bearing housing 20 that also serves as a pipe joint. The rear end of the auxiliary tube 15 is connected to a lower end part of the seat tube 12 via a pipe joint 22.

The tubular bearing housing 20 rotatably supports a crankshaft 24 that extends substantially horizontally in the lateral direction. The left and right end portions of the crankshafts 24 protrude outwardly from the tubular bearing housing 20 to the left and right, respectively, and the base ends of the left and right crankarms 26 and 28 each having a substantially rectangular cross section are fixedly attached to the respective end portions of the crankshafts 24 that protrude in the lateral direction with a rotational phase difference of 180 degrees. The crankshaft 24 forms the rotational center of the crankarms 26 and 28, and the rotational center line of the crankshaft 24 and the rotational center line of the crankarms 26 and 28 are on the same axial line.

Figure 2:
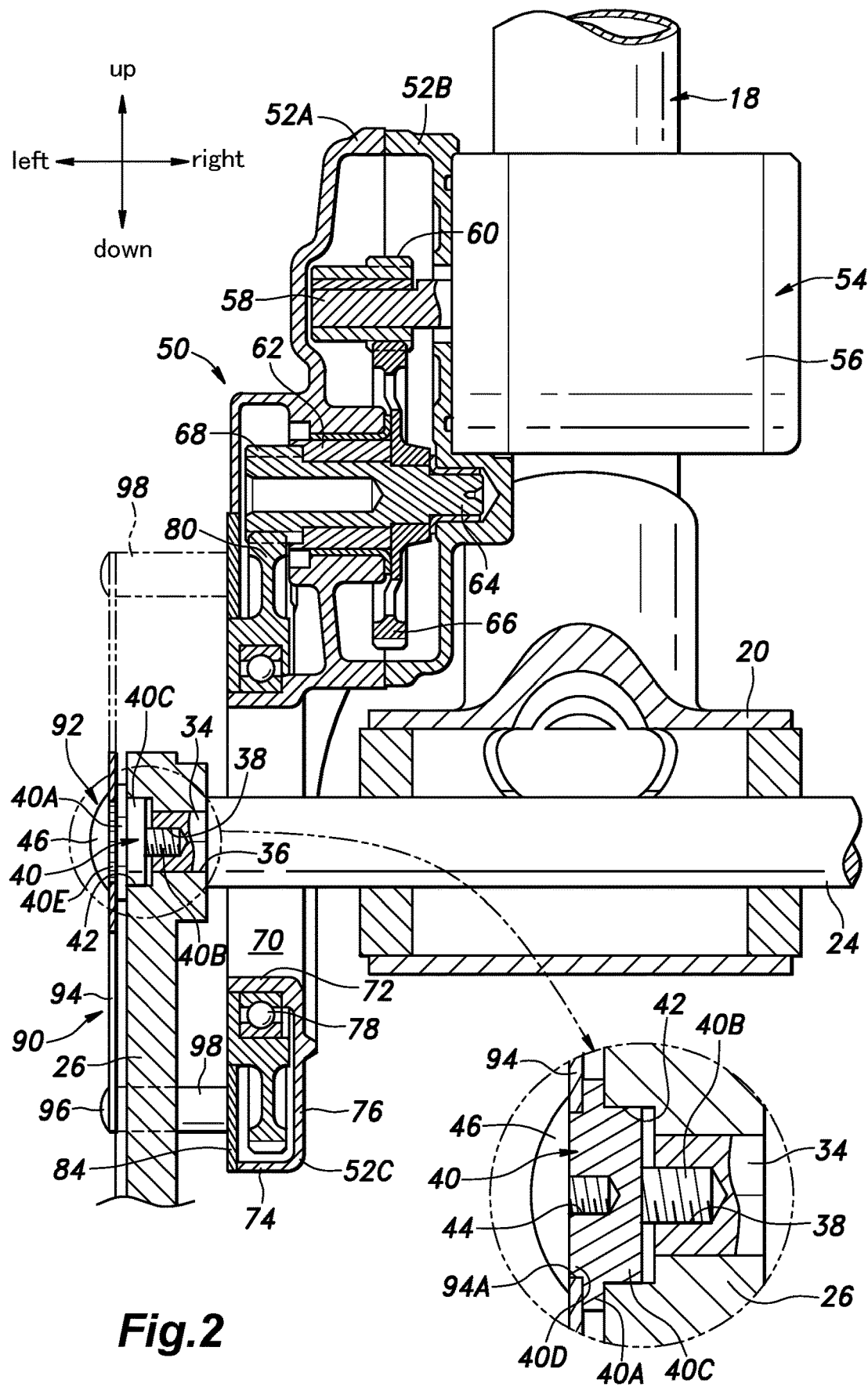
FIG. 2 is a vertical sectional view of the retrofit electric machine for a bicycle of the first embodiment.

As shown in FIG. 2, the crankshaft 24 and the crankarm 26 are connected to each other with a shape fit between a rectangular rod portion 34 formed in the corresponding protruding end of the crankshaft 24 and a rectangular hole 36 formed in the base end of the crankarm 26 so that the crankshaft 24 and the crankarm 26 are connected to each other in a torque transmitting relationship or in a rotationally fast manner. The end surface of the rectangular rod portion 34 of the crankshaft 24 is formed with a screw hole 38. A male thread portion 40B of a fixing screw member (fixing member) 40 having a head 40A with two flattened sides is threaded into this screw hole 38. Owing to this threading engagement, the crankarms 26 and 28 are fixedly attached to the crankshaft 24 without the fear of being pulled away from the crankshaft 24. The base end of the crankarm 26 is formed with a circular hole 42 that is connected to the rectangular hole 36 from the left (outboard side). The fixing screw member 40 is further provided with a circular columnar portion 40C between the head 40A and the male thread portion 40B, and the circular columnar portion 40C is fitted into the circular hole 42.

A pedal 30 is attached to the free end of each crankarm 26, 28 (see FIG. 1). A drive sprocket 32 is positioned between the right crankarm 28 and the tubular bearing housing 20. The drive sprocket 32 is connected to the crankshaft 24 which is rotatably supported by a bearing (not shown in the drawings) received in the tubular bearing housing 20.

The crankshaft 24 is rotationally driven by the crankarms 26 and 28. The rotation of the crankshaft 24 (rotation in the forward travel direction) is transmitted to the drive sprocket 32, and is transmitted from the drive sprocket 32 to a rear wheel (not shown in the drawings) via a chain transmission mechanism (not shown in the drawings). Thereby, the bicycle 10 is caused to travel forward by the rotation of the crankshaft 24.

So far, the structure is similar to that of a common existing bicycle 10.

As shown in FIG. 1, a retrofit electric device 50 for a bicycle (hereinafter, referred to as an electric power assist device 50) of the present embodiment is mounted to a part of the bicycle 10 so as to adjoin an outer side of the tubular bearing housing 20. In the following description, the up, down, front, back, left and right directions are directions with respect to the condition in which the electric power assist device 50 is mounted to the frame 18 of the bicycle 10 as shown in FIG. 1.

Figure 3:
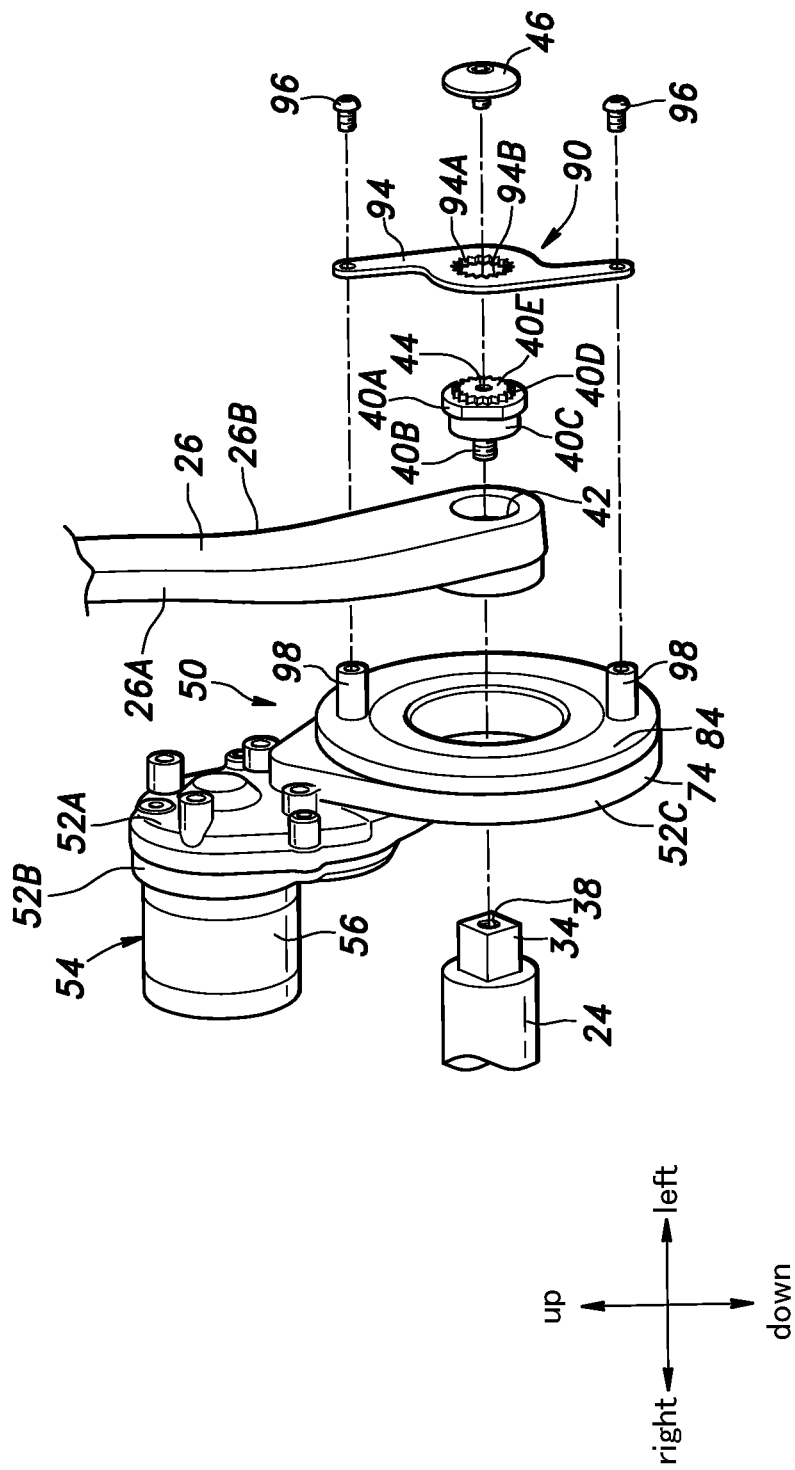
FIG. 3 is an exploded perspective view of the retrofit electric machine for a bicycle of the first embodiment.

As shown in FIGS. 1 to 3, the electric power assist device 50 includes a housing 52 defining a hollow interior, and formed by a first half 52A on the left and a second half 52B on the right.

An electric motor 54 is attached to the housing 52. The electric motor 54 has a cylindrical outer casing 56 including a base end fixed to the outer surface of the second half 52B. The outer casing 56 protrudes rightward or outward from the second half 52B.

As shown in FIG. 2, the electric motor 54 has an output shaft 58 that projects leftward from the second half 52B into the housing 5. The output shaft 58 fixedly supports a small-diameter drive spur gear 60. The first half 52A rotatably supports an intermediate shaft 64 via a bush 62 or the like therein. The intermediate shaft 64 fixedly supports a large-diameter intermediate spur gear 66 that meshes with the drive spur gear 60 on the right side of the bush 62. The intermediate shaft 64 has a small-diameter intermediate spur gear 68 integrally formed thereon on the left side of the bush 62.

The first half 52A is integrally provided with an annular portion 52C extending downward from the first half 52A. The annular portion 52C includes a cylindrical portion 72 that defines a central opening 70, a substantially cylindrical outer peripheral portion 74 that is formed concentric with the cylindrical portion 72 radially outward of the cylindrical portion 72, and a right side portion 76 consisting of an annular plate extending between the cylindrical portion 72 and outer peripheral portion 74, and is thus configured to be open on the left side.

An annular large output spur gear 80 is rotatably mounted on the outer peripheral portion of the cylindrical portion 72 via a ball bearing 78. The output spur gear 80 meshes with the intermediate spur gear 68. Thus, a two-stage transmission gear train including the intermediate spur gear 66 and the intermediate spur gear 68 is formed between the drive spur gear 60 and the output spur gear 80.

An annular rotating plate (rotating member) 84 is fixedly secured to the left side of the output spur gear 80 in a concentric relationship. The entire left side surface of the rotating plate 84 is exposed to the left on the left side of the annular portion 52C, and is rotatable jointly with the output spur gear 80 around the central axial line of the cylindrical portion 72 radially outwardly of the central opening 70. The rotating plate 84 is thus rotationally driven by the electric motor 54 via the above-described two-stage transmission gear train.

Since both the output spur gear 80 and the rotating plate 84 have an annular shape concentric with the central opening 70, both axial ends of the central opening 70 are open without being obstructed by the output spur gear 80 or the rotating plate 84, and extends laterally with a constant inner diameter.

In this electric power assist device 50, the housing 52 is fixed to the frame 18 of the bicycle 10 in such a manner that the crankshaft 24 passes through the central opening 70, and the annular portion 52C of the housing 52 and the rotating plate 84 are positioned between the frame 18 and the left crankarm 26, and the rotating plate 84 is positioned in a coaxial relationship to the crankshaft 24 by virtue of a connecting mechanism 90 and is connected to the crankshaft 24 and the crankarm 26 in a torque transmitting relationship.

The connecting mechanism 90 includes a plate-shaped connecting plate 94 extending substantially linearly as viewed in an axial direction of the crankshaft 24 (substantially I-shaped) and provided with a first connecting portion 92 for connection with the crankshaft 24 in a middle part thereof, and a pair of connecting pins 98 (serving as second connecting portions) that are attached to parts of the connecting plate 94 that are separated from each other by 180 degrees in the rotational direction of the rotating plate 84, and integrally attached to the corresponding end parts of the connecting plate 94 by using bolts 96, respectively. As shown in FIG. 1, one of the two connecting pins 98 is provided with an abutting portion configured to abut against the outer surface 26A on the assisting force applying side of the crankarm 26, or to the outer surface 26A on the trailing side of the crankarm 26 with respect to the pedaling rotational direction.

Thus, the assist force generated by the electric motor 54 is transmitted from the rotating plate 84 to the crankarm 26 and the crankshaft 24 via one of the connecting pins 98 and the connecting plate 94 of the connecting mechanism 90.

As shown in FIGS. 2 and 3, an outer end part of the head 40A (which is provided in the part of the fixing screw member 40 opposite from the male thread portion 40B and the circular columnar portion 40C with respect to the axial direction) of the fixing screw member 40 for the left crankarm 26 is formed with external teeth portion 40E having external teeth (serration) along the outer circumference thereof. A lengthwise middle point of the connecting plate 94 is provided with a through hole 94B having internal teeth (serration) 94A formed along the inner circumference thereof.

In the first connecting portion 92, a shape fit formed by the meshing between the external teeth 40D and the internal teeth 94A connect the connecting plate 94 with the fixing screw member 40 and the crankshaft 24 so that the connecting plate 94 rotate integrally with (, or does not rotate relative to) the fixing screw member 40 and the crankshaft 24 fastened to the connecting plate 94 by the fixing screw member 40. The fixing screw member 40 is formed with a screw hole 44 opening at the end surface of the external tooth portion 40E. By threading a headed screw 46 (screw with a head) into the screw hole 44 from the side of the connecting plate 94, the connecting plate 94 is fixedly secured to the fixing screw member 40.

As a result, the crankarm 26 which is engaged by the crankshaft 24 with shape fit is prevented from rotating relative to the connecting pins 98, and the state where one of the connecting pins 98 abuts against the corresponding outer surface 26A of the crankarm 26 is maintained as shown in FIG. 1. As a result, an unnecessary gap is prevented from being created between one of the connecting pins 98 and the outer surface 26A of the crankarm 26 during use.

Thus, the assist force can be transmitted from the rotating plate 84 to the crankarm 26 without causing any relative rotational displacement (rotational play) between the rotating plate 84 and the crankarm 26.

Furthermore, owing to the shape fit between the external teeth 40D and the internal teeth 94A, the rotation of the rotating plate 84 can be transmitted to the crankshaft 24 and the crankarm 26 via the connecting pin 98, the bolt 96, the connecting plate 94, and the fixing screw member 40. Also, owing to the shape fit between the external teeth 40D and the internal teeth 94A, the rotation of the crankshaft 24 and the crankarm 26 can be transmitted to the rotating plate 84 via the connecting pin 98, the bolt 96, the connecting plate 94, and the fixing screw member 40.

As described above, the torque transmission of the electric power assist device 50 to the bicycle 10 is performed by the abutting of one of the connecting pins 98 against the outer surface 26A of the crankarm 26. Therefore, the electric power assist device 50 can be adapted a wide range of bicycles 10 having crankarms 26 of different shapes and dimensions, and thus has a high versatility.

As shown in FIG. 1, a control unit 130 for electric power assist and a battery 132 serving as a power source for the electric motor 54 and the control unit 130 are attached to the seat tube 12 by using a fastening band (not shown in the drawings) or the like.

The electric power assist device 50 can be attached to the bicycle 10 by a worker according to the following procedure.

First of all, the left pedal 30 on the side not fitted with the drive sprocket 32 is removed by using a common tool such as a spanner. Next, with the electric power assist device 50 laid on one side (so that the electric motor 54 faces upward) and the connecting plate 94 removed therefrom, the free end of the left crankarm 26 is passed into the central opening 70 and moved along the length of the crankarm 26 until the electric power assist device 50 reaches the base end (the rotational center) of the crankarm 26. Thus, the crankarm 26 is passed through the rotating plate 84 and the annular portion 52C until the electric power assist device 50 reaches the base end part of the crankarm 26. If the central opening 70 is large enough for the pedal 30 to pass through, the pedal 30 is not required to be removed.

Thereafter, the posture of the electric power assist device 50 is changed in such a manner that the electric motor 54 faces in the lateral direction (the posture shown in FIG. 1), and the crankshaft 24 is passed through the central opening 70 in the axial direction. Thus, the rotating plate 84 and the annular portion 52C can be positioned between the frame 18 and the crankarm 26 simply by removing the pedal 30. At this time, the electric motor 54 is positioned vertically between the auxiliary tube 15 and the down tube 14 on the front side of the lower end part of the seat tube 12 as shown in FIG. 1. The electric power assist device 50 can be fixedly secured to the frame 18 by fixing the outer casing 56 of the housing 52 or the electric motor 54 to the seat tube 12, the down tube 14, or the auxiliary tube 15 by using a fastening band (not shown in the drawings) made of rubber or the like.

Then, the crankarm 26 or the rotating plate 84 is manually rotated until one of the connecting pins 98 is brought into contact with the outer surface 26A of the crankarm 26. In this state, the two ends of the connecting plate 94 are aligned with the respective connecting pins 98 in the rotational direction, and the internal teeth 94A of the connecting plate 94 are meshed (shape fit) with the external teeth 40D of the fixing screw member 40 which is fastened to the crankshaft 24. The two ends of the connecting plate 94 are fixed to the corresponding connecting pins 98 by using the bolts 96, and the connecting plate 94 is fixed to the fixing screw member 40 by using the headed screw 46. The connecting pins 98 may also be attached to the rotating plate 84 in advance, or may be attached to the rotating plate 84 of the electric power assist device 50 by using screws or the like after the various parts are positioned as described above.

Thereafter, the pedal 30 is attached to the crankarm 26, and this concludes the mounting of the electric power assist device 50.

In this mounted state, the rotating plate 84 is exposed to the left between the tubular bearing housing 20 and the crankarm 26, and is connected to the rotational center of the crankarm 26 and the crankshaft 24 in a coaxial manner via the connecting mechanism 90 attached to the exposed surface (left surface) of the rotating plate 84.

As a result, the crankarm 26 and the crankshaft 24 of the existing bicycle 10 are concentrically (coaxially) connected to the rotating plate 84 via the connecting mechanism 90, and the rotation of the rotating plate 84 is transmitted to the crankshaft 24 without any runout.

Since the electric motor 54 is in a position that is offset radially outward with respect to the annular portion 52C and the rotating plate 84 owing to the presence of the above-described transmission gear train, the electric motor 54 is prevented from interfering with the positioning of the annular portion 52C and the rotating plate 84 relative to the crankarm 26.

As described above, a general user can easily retrofit the electric power assist device 50 to any existing bicycle 10 which may vary particularly in the configuration and dimensions of the crankarm 26 without modifying the bicycle 10 and without requiring any special tool so that a wide range of existing bicycles not limited to those having frame structures of any particular configurations can be converted into electric power assisted bicycles without any difficulty.

Figure 4:
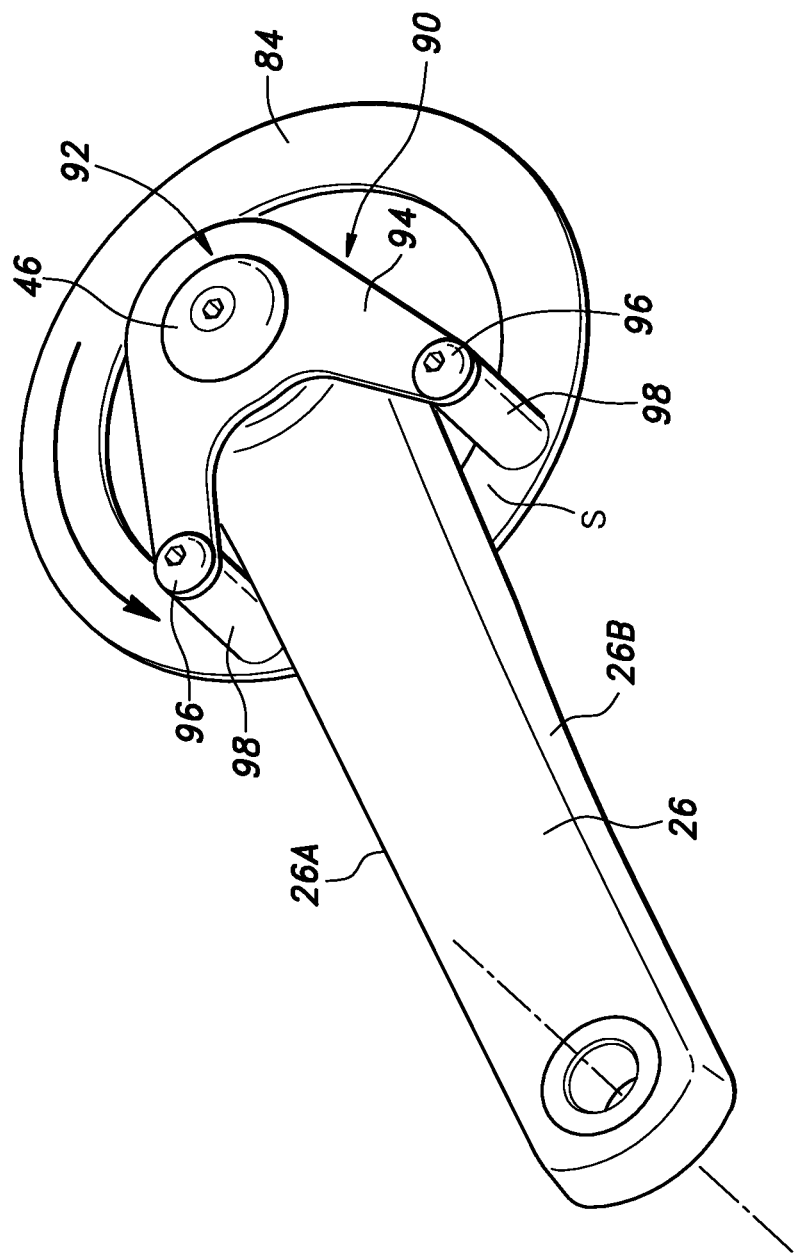
FIG. 4 is a perspective view of an essential part of a retrofit electric machine for a bicycle according to a second embodiment of the present invention.

An electric power assisted device for a bicycle according to a second embodiment of the present invention is described in the following with reference to FIG. 4. In FIG. 4, parts corresponding to those in FIGS. 1 to 3 are denoted with the same reference numerals as those in FIGS. 1 to 3 without repeating the description of such parts.

In the second embodiment, the two connecting pins 98 are positioned such that the spacing between the two connecting pins 98 along the circumferential direction of the rotating plate 84 is slightly greater than the maximum width of existing crankarms 26, and one of the connecting pins 98 abuts against the outer surface 26A of the crankarm 26 on the trailing side with respect to the pedaling rotational direction. The other connecting pin 98 located on the leading side of the crankarm 26 with respect to the pedaling rotational direction opposes the outer surface 26B of the crankarm 26 on the leading side with respect to the pedaling direction with a gap S that can safely accommodate variations in the dimensions and shapes of the existing crankarms 26.

The connecting plate 94 is U-shaped or V-shaped when viewed in the axial direction of the crankshaft 24 so that the ends are aligned with the connecting pins 98 according to the particular arrangement of the connecting pins 98. The shape of the connecting plate 94 may be appropriately selected from esthetic view point.

The configurations of the second embodiment are otherwise substantially the same as those of the first embodiment. Thus, the second embodiment provides similar effect and advantages as the first embodiment.

Figure 5:
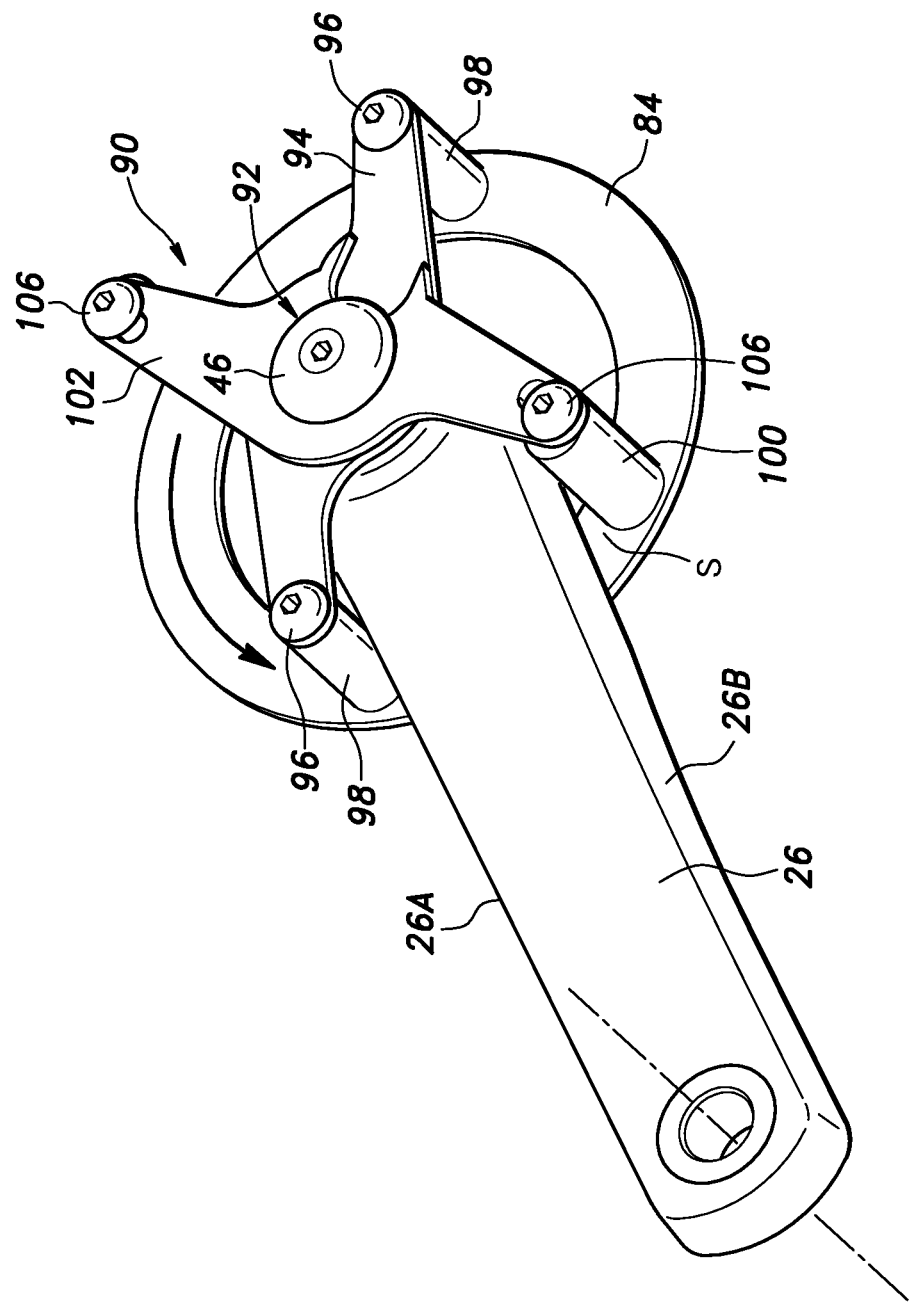
FIG. 5 is a perspective view of an essential part of a retrofit electric machine for a bicycle according to a third embodiment of the present invention.
Figure 6:
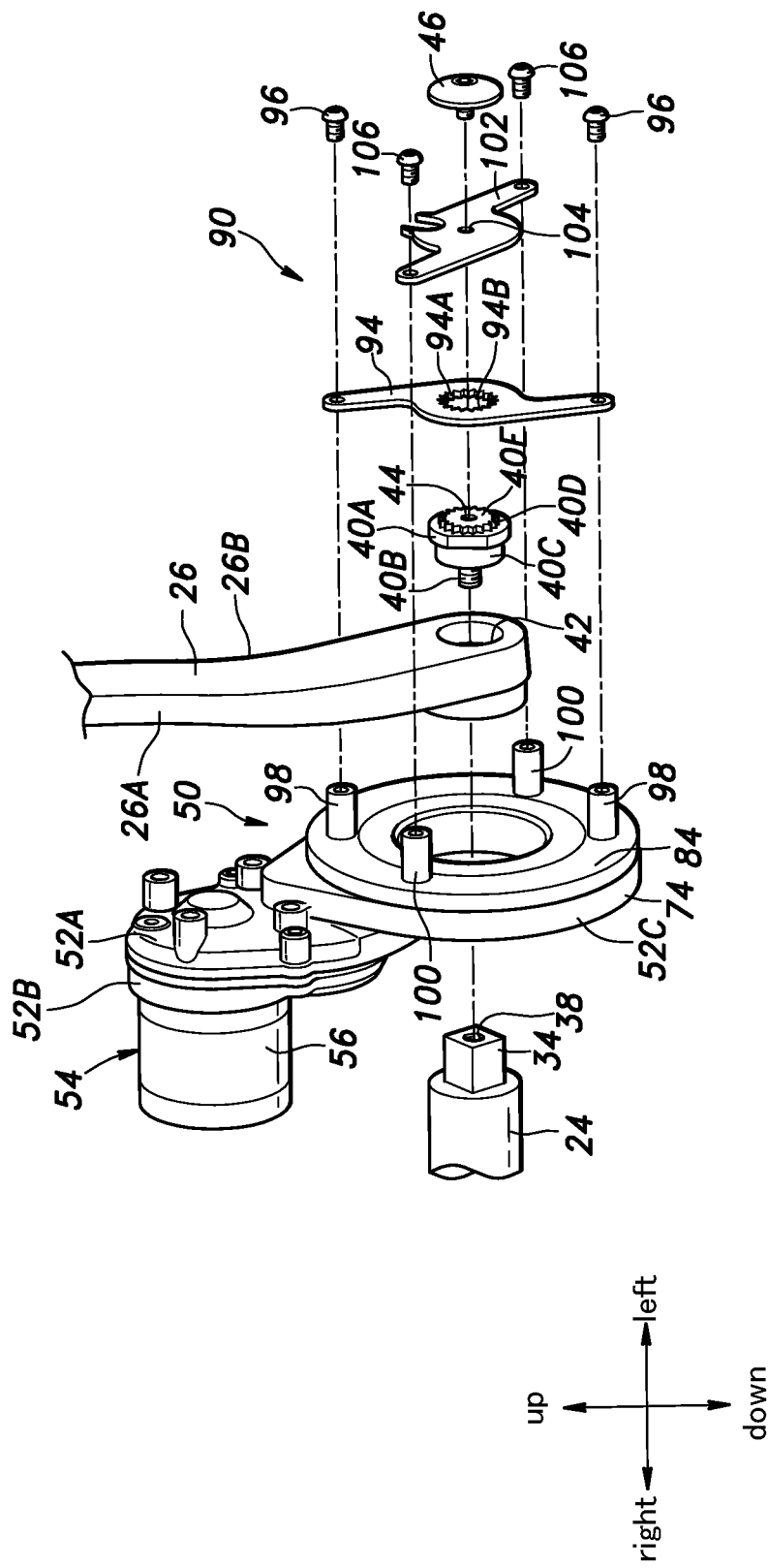
FIG. 6 is an exploded perspective view of the retrofit electric machine for a bicycle of the third embodiment.

An electric power assisted device for a bicycle according to a third embodiment of the present invention is described in the following with reference to FIGS. 5 and 6. In FIGS. 5 and 6, parts corresponding to those in FIGS. 1 to 3 are denoted with the same reference numerals as those in FIGS. 1 to 3 without repeating the description of such parts.

In the third embodiment, in addition to the connecting plate 94 which is connected to the rotating plate 84 via the two connecting pins 98, a plate-shaped auxiliary connecting plate 102 is connected to the rotating plate 84 via a pair of connecting pins 100 that are located at two locations displaced from the connecting pins 98 in the rotational direction of the rotating plate 84. The auxiliary connecting plate 102 has a substantially linear shape (substantially I-shaped) when viewed in the axial direction of the crankshaft 24, and is provided with a circular hole 104 in a central part thereof. The auxiliary connecting plate 102 is in an overlapping relationship with the connecting plate 94, and a headed screw 46 is passed through the circular hole 104 so as to form a first connecting portion 92. As a result, the auxiliary connecting plate 102 is fastened jointly with the connecting plate 94 by the fixing screw member 40, and the two ends of the auxiliary connecting plate 102 are fixed to the corresponding connecting pins 100 by using bolts 106.

Thus, the connecting mechanism 90 has an X-shape when viewed in the axial direction of the crankshaft 24 owing to the foregoing arrangement of the connecting plate 94 and the auxiliary connecting plate 102, and the four end parts form a second connecting portions for connection with the rotating plate 84.

In the third embodiment, since the connecting mechanism 90 is connected to the rotating plate 84 at four points which may be symmetrical with respect to the rotational center of the rotating plate 84, the accuracy in the concentricity of the rotating plate 84 with respect to the crankshaft 24 is improved, and the connecting strength (mounting strength) between the crankshaft 24 and the rotating plate 84 is improved.

In the third embodiment, between one of the connecting pins 100 located on the leading side of the crankarm 26 with respect to the pedaling rotational direction and the outer surface 26B of the crankarm 26 on the leading side of the pedaling rotational direction is defined a gap S that can accommodate variations in the dimensions and the shapes of the crankarms 26.

The connecting plate 94 and the auxiliary connecting plate 102 may consist of an integral single-piece member.

Figure 7:
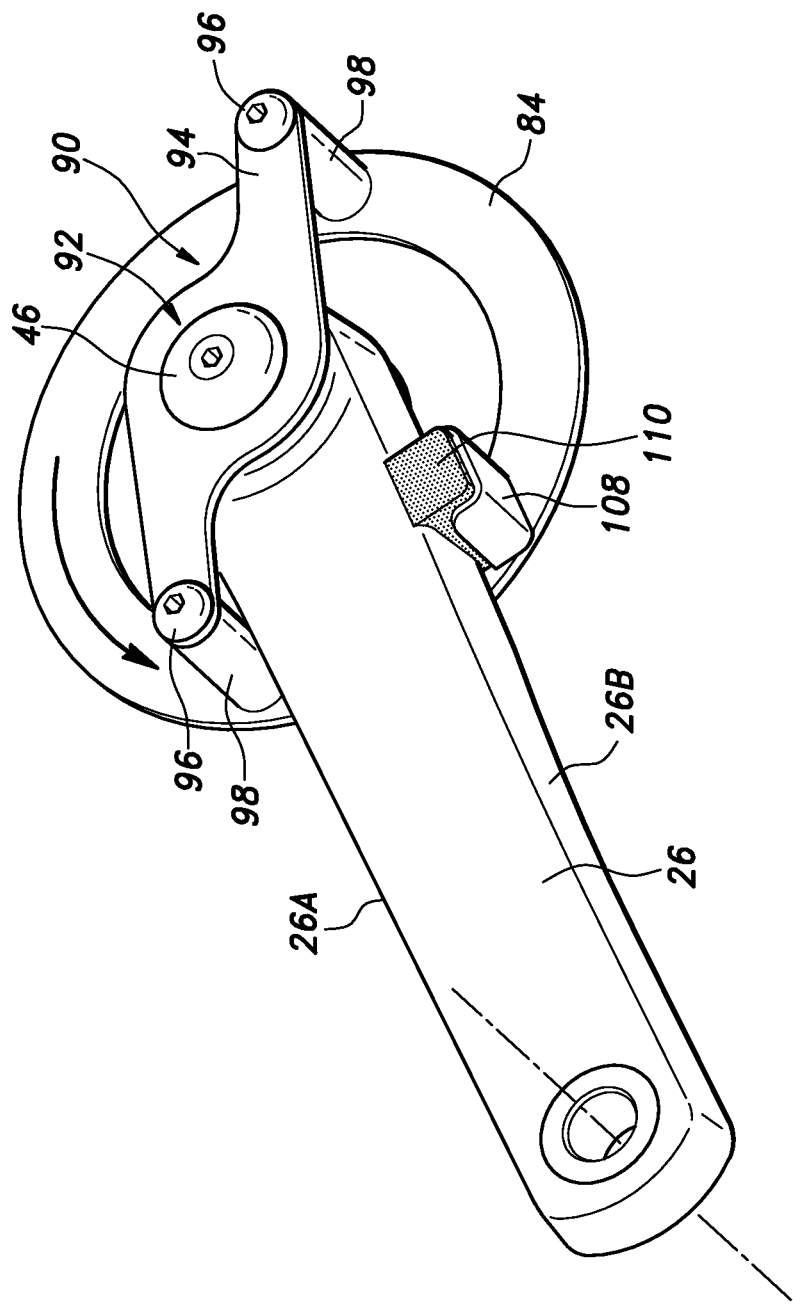
FIG. 7 is a perspective view of an essential part of a retrofit electric machine for a bicycle according to a fourth embodiment of the present invention.

An electric power assisted device for a bicycle according to a fourth embodiment of the present invention is described in the following with reference to FIG. 7. In FIG. 7, parts corresponding to those in FIGS. 1 to 3 are denoted with the same reference numerals as those in FIGS. 1 to 3 without repeating the description of such parts.

In the fourth embodiment, in addition to the structure of the first embodiment, a rubber member 110 is attached to the rotating plate 84 via a mounting piece 108. The rubber member 110 elastically abuts against the outer surface 26B of the crankarm 26 on the leading side with respect to the pedaling rotational direction which faces away from the outer surface 26A of the crankarm 26 against which the connecting pin 98 abuts.

As a result, the crankarm 26 is interposed between the connecting pin 98 and the rubber member 110 with respect to the rotational direction so that the rotating plate 84 and the crankarm 26 can be connected to each other without causing any rotational rattling in the forward rotational direction (pedaling rotational direction) or in the reverse rotational direction.

In the fourth embodiment, the crankarm 26 and the rotating plate 84 are connected to each other by the connecting mechanism 90 in a reliable manner without causing any rattling during use.

Figure 8:
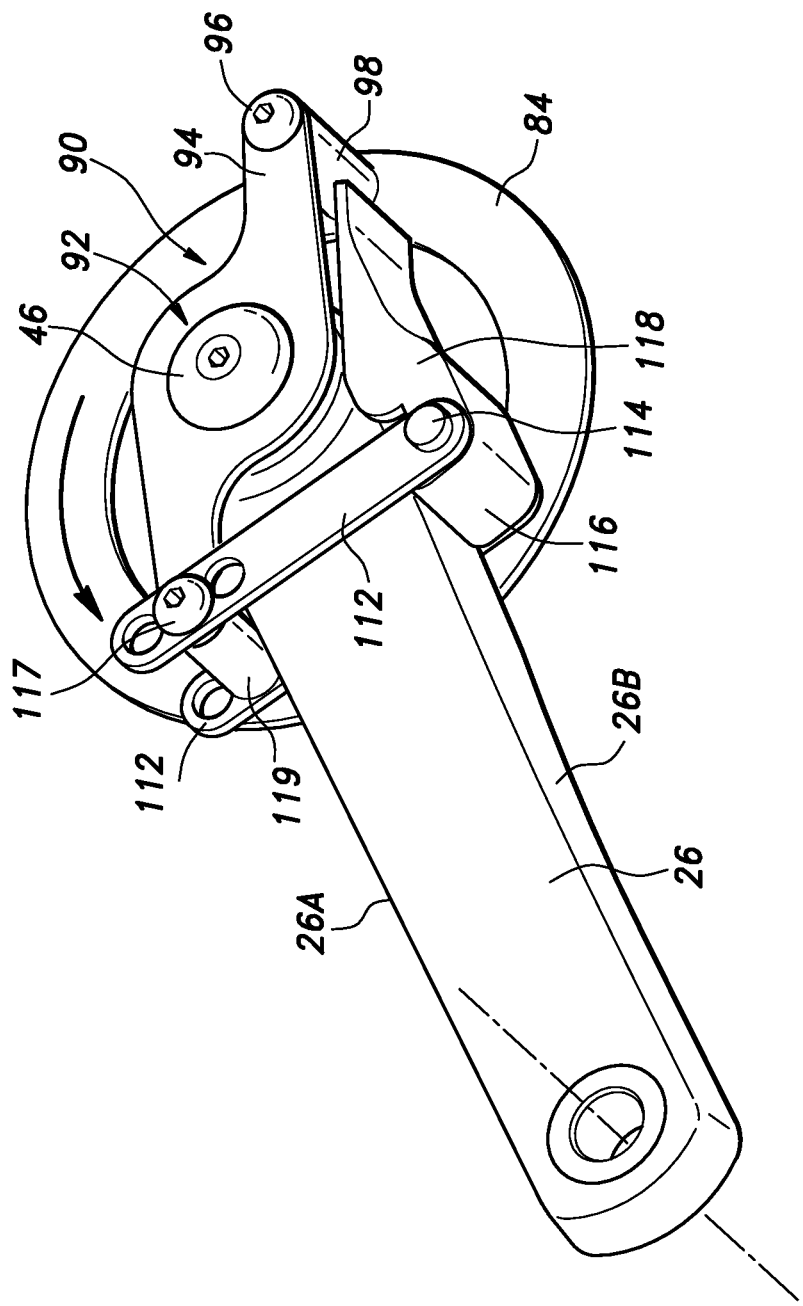
FIG. 8 is a perspective view of an essential part of a retrofit electric machine for a bicycle according to a fifth embodiment of the present invention.

An electric power assisted device for a bicycle according to a fifth embodiment of the present invention is described in the following with reference to FIG. 8. In FIG. 8, parts corresponding to those in FIGS. 1 to 3 are denoted with the same reference numerals as those in FIGS. 1 to 3 without repeating the description of such parts.

The fifth embodiment is modified from the first embodiment in that the end part of the connecting plate 94 corresponding to the outer surface 26A of the crankarm 26 on the trailing side with respect to the pedaling rotational direction is fitted with an abutting pin 119 which is connected to an end part of a link member 112 via a bolt 117, instead of using the connecting pin 98. Another end part of the link member 112 is pivotally connected to a clamp arm 118 via a pivot shaft 114. The clamp arm 118 is provided with an eccentric cam portion 116 which abuts against the outer surface 26B of the crankarm 26 on the leading side with respect to the pedaling rotational direction.

In the fifth embodiment, as the clamp arm 118 rotates, the eccentric cam portion 116 is pressed against the outer surface 26B of the crankarm 26. As a result, the crankarm 26 is clamped between the abutting pin 119 and the eccentric cam portion 116 in the rotational direction so that the rotating plate 84 and the crankarm 26 are connected to each other in both the forward rotation (pedaling rotational direction) and the reverse rotational direction without rattling.

In the fifth embodiment also, the crankarm 26 and the rotating plate 84 are connected to each other by the connecting mechanism 90 in a reliable manner without causing any rattling during use.

Figure 9:
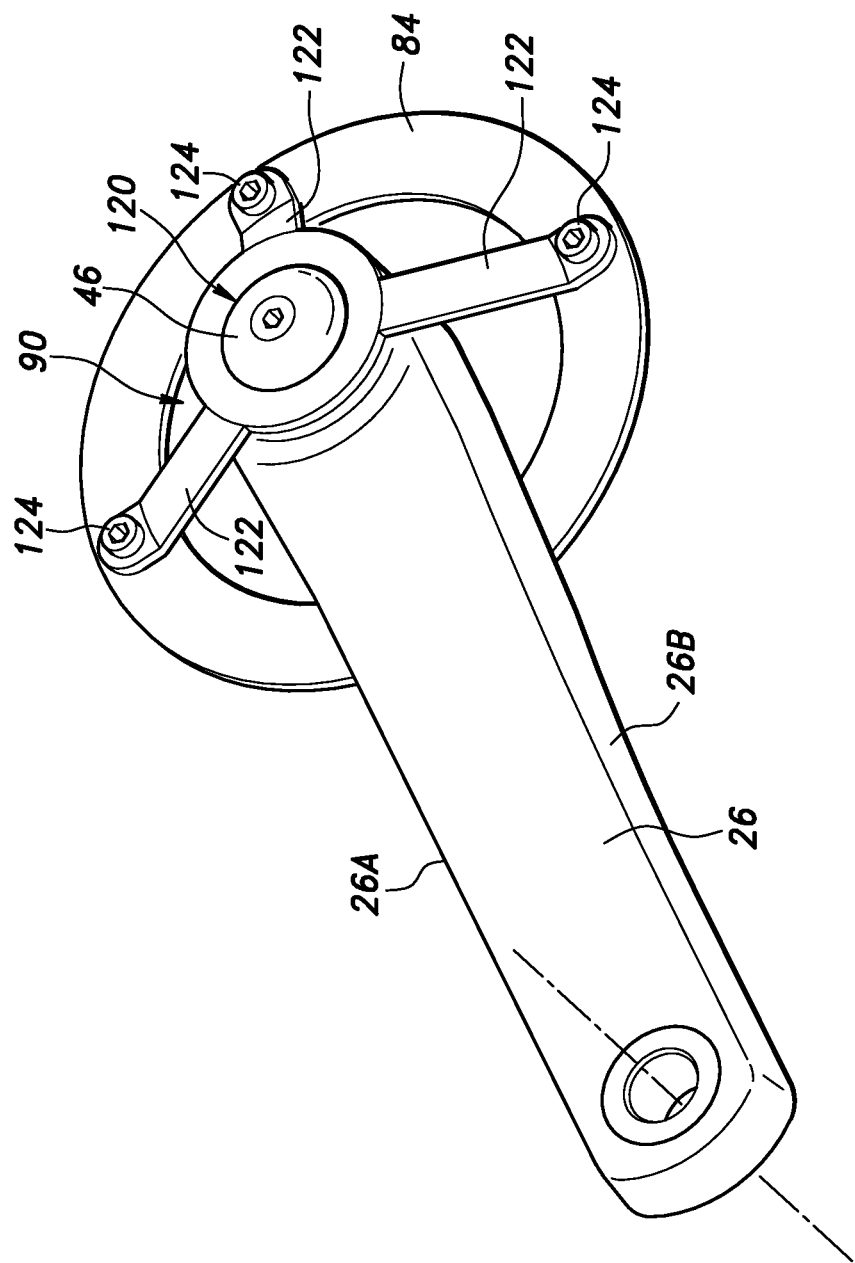
FIG. 9 is a perspective view of an essential part of a retrofit electric machine for a bicycle according to a sixth embodiment of the present invention.

An electric power assisted device for a bicycle according to a sixth embodiment of the present invention is described in the following with reference to FIG. 9. In FIG. 9, parts corresponding to those in FIGS. 1 to 3 are denoted with the same reference numerals as those in FIGS. 1 to 3 without repeating the description of such parts.

In the sixth embodiment, the rotating plate 84 is coaxially connected to the rotationally central part (base end portion) of the crankarm 26 via a connecting member 120 so that the assist force by the electric power assist device 50 is applied to the crankarm 26.

The connecting member 120 has a tripod shape, and each leg portion 122 thereof is fixed to the rotating plate 84 with a bolt 124 as a second connecting portion, and the central part thereof is coaxially connected to the crankshaft 24 and the crankarm 26 thereby forming a first connecting portion 92. The structure of the first connecting portion 92 is the same as that of the first embodiment.

In the sixth embodiment, the rotation of the rotating plate 84 is transmitted to the crankshaft 24 and the crankarm 26 via a shape fit engagement between the external teeth (not shown in the drawings) of the fixing screw member (not shown in the drawings) and the internal teeth (not shown in the drawings) of the connecting member 120 similarly as in the first embodiment.

The six embodiment shows that the abutting part abutting against the crankarm 26 is not essential for the connecting mechanism 90.

The present invention has been described in terms of specific embodiments, but is not limited by such embodiments, and can be modified in various ways without departing from the scope of the present invention. For instance, the electric power assist device 50 can be mounted on the exterior of the seat tube 12, the down tube 14, the auxiliary tube 15, the chain stay 16, the pipe joint 22, etc., instead of the tubular bearing housing 20.

The shape fit engagement between the fixing screw member 40 and the connecting plate 94 is not limited to those using teeth or serrations, but may also be those using polygonal shapes.

The electric motor 54 can also be used as a generator that generates electricity by pedaling the bicycle 10. In such a case, the connecting pin 98 will abut against the outer surface 26B of the crankarm 26 on the leading side with respect to the pedaling rotational direction.

The various elements of the present invention described in conjunction with the foregoing embodiments are not entirely essential for the present invention, and can be omitted or substituted without departing from the scope of the present invention.

GLOSSARY OF TERMS

| | |
|---|---|
| 10: bicycle | 12: seat tube |
| 14: down tube | 15: auxiliary tube |
| 16: chain stay | 18: frame |
| 20: tubular bearing housing | 22: pipe joint |
| 24: crankshaft | 26: crankarm |
| 26A: outer surface | 26B: outer surface |
| 28: crankarm | 30: pedal |
| 32: drive sprocket | 34: rectangular rod portion |
| 36: rectangular hole | 38: screw hole |
| 40: fixing screw member (connecting member) | |
| 40A: head | 40B: male thread portion |
| 40C: circular columnar portion | 40D: external teeth |
| 40E: external teeth portion | 42: circular hole |
| 44: screw hole | 46: headed screw |
| 50: retrofit electric device for a bicycle (electric power assist device) | |
| 52: housing | |
| 52A: first half | 52B: second half |
| 52C: annular portion | |
| 54: electric motor (rotating electric machine) | |
| 56: outer casing | 58: output shaft |
| 60: drive spur gear | 62: bush |
| 64: intermediate shaft | 66: intermediate spur gear |
| 68: intermediate spur gear | 70: central opening |
| 72: cylindrical portion | 74: outer peripheral portion |

-continued

| | |
|---|---|
| 76: right side portion | 78: ball bearing |
| 80: output spur gear | 84: rotating plate (rotating member) |
| 90: connecting mechanism (connecting member) | |
| 92: first connecting portion | 94: connecting plate |
| 94A: internal teeth | 94B: through hole |
| 96: bolt | 98: connecting pin |
| 100: connecting pin | 102: auxiliary connecting plate |
| 104: circular hole | 106: bolt |
| 108: mounting piece | 110: rubber member |
| 112: link member | 114: support shaft |
| 116: eccentric cam portion | 118: clamp arm |
| 120: connecting member | 122: leg portion |
| 124: bolt | 130: control unit |
| 132: battery | |

The invention claimed is:

1. A retrofit electric machine for a bicycle, comprising:
a housing configured to be attached to a frame of a bicycle,
a rotating electric machine attached to the housing;
an annular rotating member mounted on the housing in a rotatable manner to be centered around a rotational center line of a crankshaft for a pedal of the bicycle, and connected to the rotating electric machine in a torque transmitting relationship; and
a connecting mechanism including a connecting member, a first connecting portion configured to connect the connecting member to the crankshaft with a shape fit such that the connecting member rotates integrally with the crankshaft, and a second connecting portion fixedly connecting the connecting member to the rotating member,
wherein the second connecting portion includes an abutting portion configured to abut against a surface of a crankarm connected to the crankshaft on a trailing side of a pedaling rotational direction thereof.

2. The retrofit electric machine for a bicycle according to claim 1, wherein the first connecting portion includes external teeth formed in a fixing member configured to be fixed to the crankshaft, and internal teeth formed in the connecting member and meshing with the external teeth.

3. The retrofit electric machine for a bicycle according to claim 1, wherein the connecting member is provided with a linear shape, a U-shape or a V-shape as viewed in an axial direction of the crankshaft, and has the first connecting portion in an intermediate part thereof and the second connecting portion in each end part thereof, at least one of the second connecting portions being provided with the abutting portion.

4. The retrofit electric machine for a bicycle according to claim 1, further comprising a rubber member attached to the rotating member so as to elastically abut against a surface of the crankarm on a leading side of the pedaling rotational direction thereof.

5. The retrofit electric machine for a bicycle according to claim 1, wherein the connecting member is X-shaped as viewed in an axial direction of the crankshaft, and has the first connecting portion in a central part thereof and the second connecting portion in each end part thereof, at least one of the second connecting portions being provided with the abutting portion.

6. The retrofit electric machine for a bicycle according to claim 1, wherein the housing includes an annular part concentrically supporting the rotating member, and the annular part and the rotating member are configured to be positioned between the frame and the crankarm.

7. The retrofit electric machine for a bicycle according to claim 1, further comprising a transmission gear train provided inside the housing between the rotating electric machine and the rotating member such that the rotating electric machine is offset radially outward relative to the rotating member owing to positioning of the transmission gear train.

8. The retrofit electric machine for a bicycle according to claim 1, wherein the rotating electric machine consists of an electric motor for generating an assist force, and the retrofit electric machine further comprises a battery configured to be mounted on the frame and to serve as a power source for the electric motor.

9. A bicycle fitted with the retrofit electric machine for a bicycle according to claim 1.

10. A retrofit electric machine for a bicycle, comprising:
a housing configured to be attached to a frame of a bicycle,
a rotating electric machine attached to the housing;
an annular rotating member mounted on the housing in a rotatable manner to be centered around a rotational center line of a crankshaft for a pedal of the bicycle, and connected to the rotating electric machine in a torque transmitting relationship; and
a connecting mechanism including a connecting member, a first connecting portion configured to connect the connecting member to the crankshaft with a shape fit such that the connecting member rotates integrally with the crankshaft, and a second connecting portion fixedly connecting the connecting member to the rotating member,
wherein the second connecting portion includes an abutting pin fixed to the rotating member and provided with an abutting portion configured to abut against a surface of a crankarm connected to the crankshaft on a trailing side of a pedaling rotational direction thereof, a link member having an end connected to the abutting pin, and a clamp arm pivotally connected to another end of the link member and provided with an eccentric cam portion configured to abut against a surface of the crankarm on a leading side thereof with respect to the pedaling rotational direction.

\* \* \* \* \*